Aug. 30, 1932.  H. E. WHITE  1,874,399
WELDING APPARATUS
Filed March 14, 1930   2 Sheets-Sheet 1
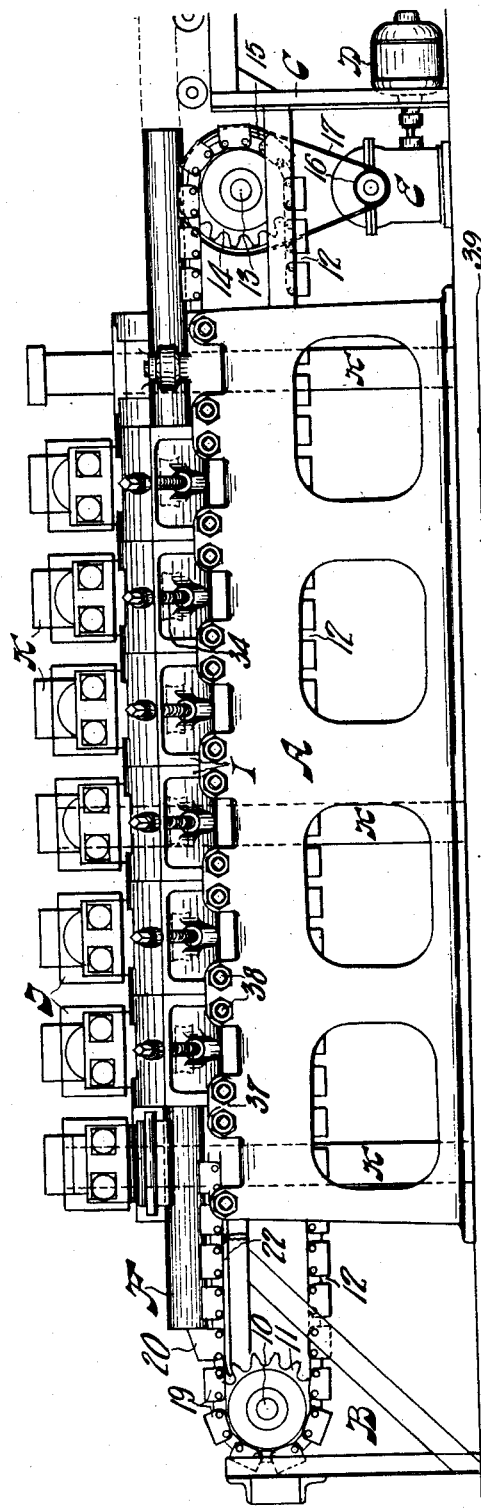
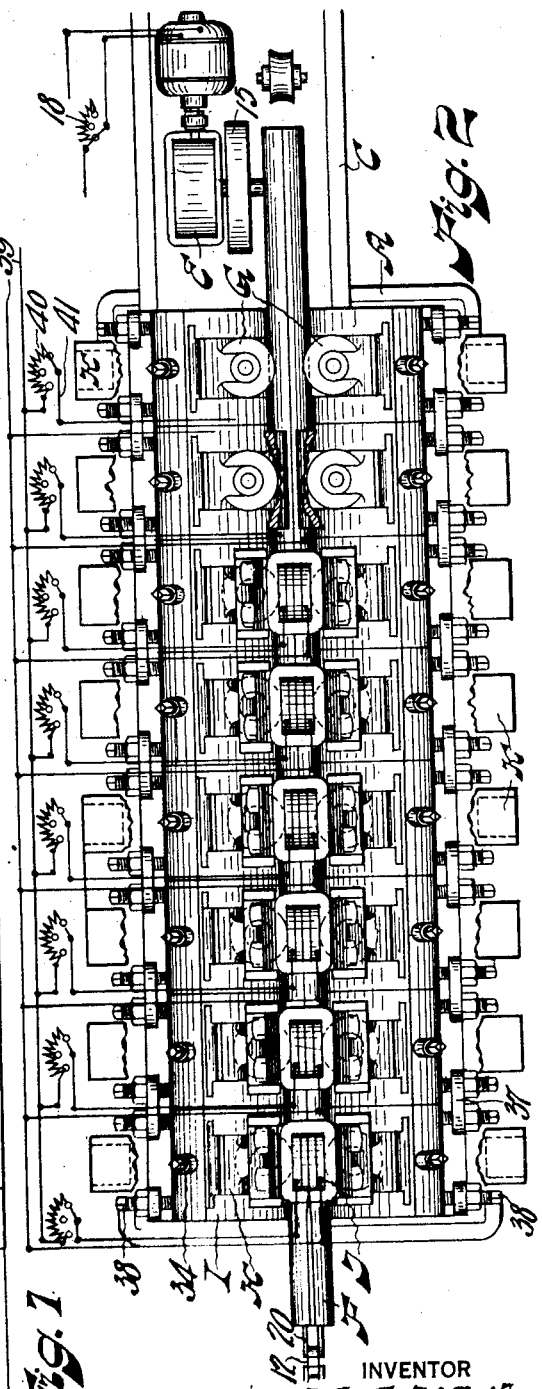
INVENTOR
H. E. White
BY
C. F. Heinkel,
ATTORNEY

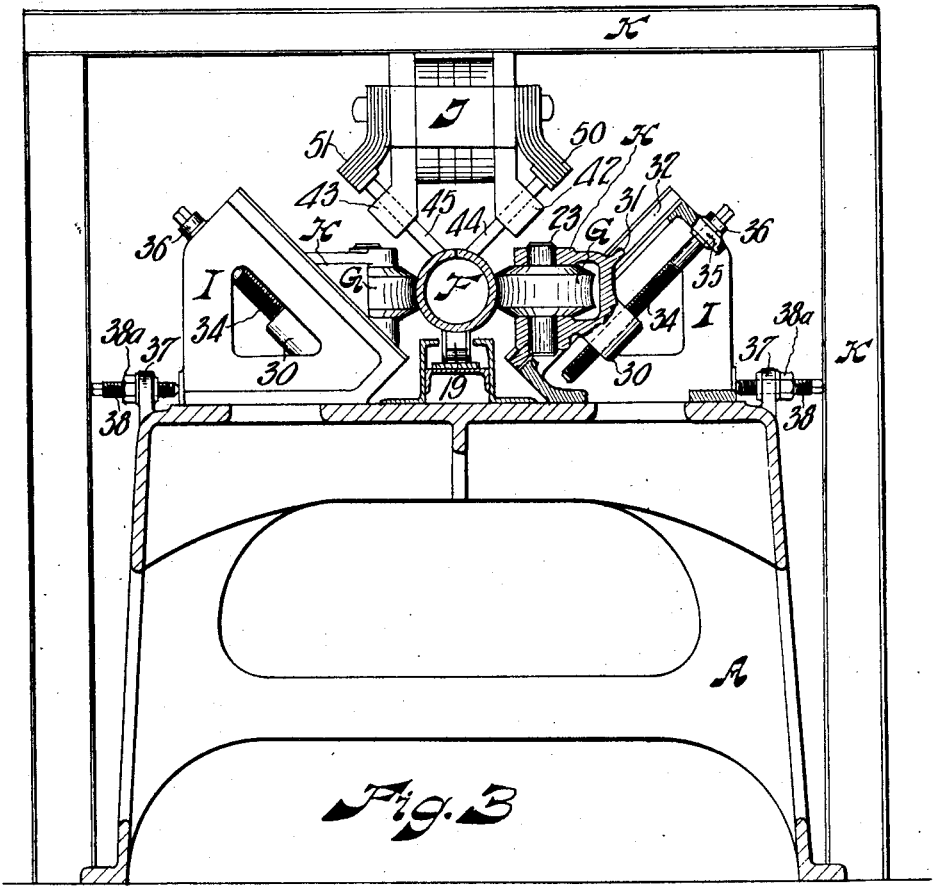
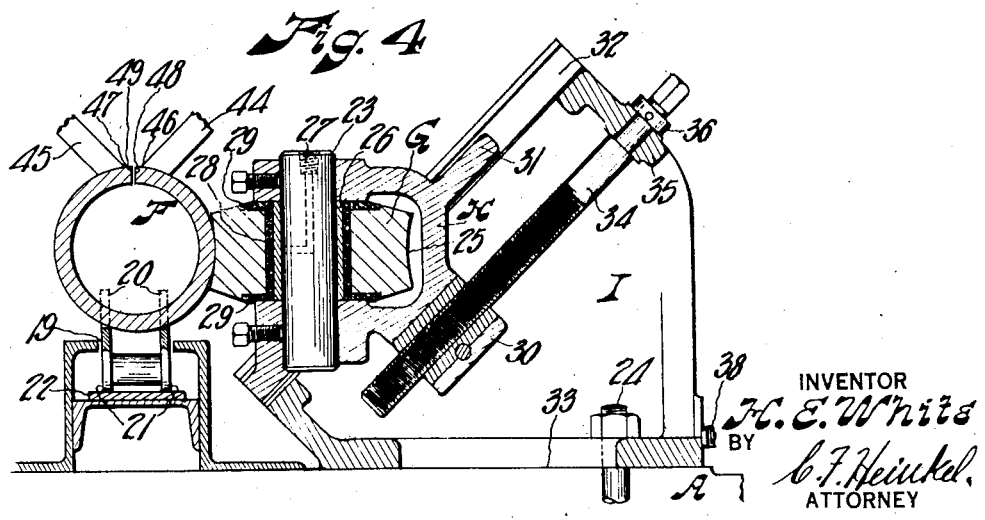

Patented Aug. 30, 1932

1,874,399

UNITED STATES PATENT OFFICE

HERBERT E. WHITE, OF CLEVELAND HEIGHTS, OHIO

WELDING APPARATUS

Application filed March 14, 1930. Serial No. 435,745.

My invention relates particularly to apparatus for welding longitudinal seams in tubular articles.

The main object of my invention is a simple and easily operable and efficient welding means or apparatus for longitudinal seams of tubular articles to produce a continuous weld with a minimum expenditure of time and of power and of welding energy and with a minimum loss of material.

Other objects will be pointed out in this specification or will become obvious or apparent or will suggest themselves upon an inspection of this specification and the accompanying drawings.

Although the prior art has made rapid strides in promoting the welding of seams on tubing and the like, it has not attained a satisfactory stage.

My discovery and invention, as exemplified in this application as to apparatus and in my co-pending application Serial No. 433,582 as to method, is a step in advance of the prior art and is assumed to be the best and most economical and most satisfactory means of welding seams of tubing.

I attain my object by simplicity of structure of the apparatus including structural duplication of parts; by moving the articles longitudinally through the apparatus and in continuous contact with a welding agent by an individual feeding means which is adjustable to meet various welding conditions; by automatically relating the seam parts or seam faces as required for welding during the progressive stages of welding as the article is moving through the apparatus; by making the seam faces relating means adjustable to meet various welding conditions; by applying welding heat to the articles immediately across the seam and practically along the entire part of the article which is then moving through the welding part of the apparatus; by adjustability of the heating means and control thereof to meet various welding conditions; by co-ordination of the clamping or holding and feeding or moving and heating of the article; and by adjustability of the apparatus as a whole for adaptation thereof to variously sized articles.

One type of apparatus, embodying my invention, is shown in the accompanying drawings and described herein in detail for illustration but not for limitation purposes since I am aware that my invention can be embodied in other types of apparatus.

In the accompanying drawings mentioned above:

Fig. 1 is a side view of an apparatus embodying my invention and designed for welding longitudinal seams of round tubing made of sheet metal and having the seam faces or longitudinal edges of the sheet in opposing end to end abutment.

Fig. 2 is a plan view of the apparatus shown in Fig. 1, partly broken away in parts to more clearly show relations of parts.

Fig. 3 is a transverse section, on a larger scale, taken in a vertical plane through each of the welding units as is indicated by the line 3 in Fig. 1 showing more clearly the relation of brushes and transformers and clamping or holding means and the tubing.

Fig. 4 is a section on a larger scale taken in a plane through one side of each of the clamping means transversely of the apparatus, as indicated by the line 4 in Fig. 1, showing more clearly the adjusting means for the rollers and for the clamping or holding means as a whole.

Similar reference characters refer to similar parts throughout the views.

The bed, as used herein, comprises the cast part A forming the welding part of the apparatus, the structurally formed part B forming the loading part of the apparatus, and the structurally formed part C forming the discharging part of the apparatus.

The shaft 10 is journaled in the loading part B and carries the wheel 11 shown with teeth to guide the tube moving chain 12 although other chain guiding means can be used.

The shaft 13 is journaled in the discharging part C and carries the wheel 14 rotatable therewith and toothed to engage and to drive the chain 12 although a flat faced pulley and a belt could be used, and also carries the wheel 15 rotatable therewith to rotate the wheel 14 and thereby move the chain.

The motor D, an electric motor in this instance, has the shaft thereof extending into the rotation transmitting device E to rotate the wheel 16 mounted on the outside thereof to move the belt 17 which extends over the same and over the wheel 15 and thereby move the chain when the motor is running.

A speed control means, as the rheostat 18, for instance, is inserted into the electric circuit of the motor so that the speed thereof can be varied to vary the speed of travel of the chain.

A speed change mechanism of any suitable design, now well known in the art, not shown in the drawings, can be, and preferably is mounted in the device E so that speed variations or changes can be effected therein in addition to, or conjointly with, or independently of the speed variation by the motor control and transmitted to the wheel 16 for variation or change of the traveling speed of the chain.

The chain 12, in the instance shown, is composed of the pivotally connected links 19 some of which have the upwardly extending lug 20 thereon to engage the end of tubings for movement thereof through the apparatus; all of the links having the downwardly extending ears 21 riding on the track 22 to move the tubing F, normally supported on the chain, in a definite path at a definite distance upwardly of the bed to correctly feed the tubing into the welding part of the apparatus.

Each of the clamping rollers G, in this instance, sixteen in number spaced oppositely or in pairs transversely of the apparatus and the pairs spaced longitudinally thereof, is journaled on the shaft 23 mounted in one of the carriages H which is slidably mounted in one of the blocks I which is mounted on the part A and is movable thereon for adjustment and is clamped in position by means of the bolts 24.

Each of the rollers, duplicates of each other, has the outer circumferential surface 25 thereof of concave form of a radius somewhat larger than the radius of the tubing and also has the bushing 26 for bearing on the shaft 23 and the lubrication means 27 for the journal between the shaft and the roller and also has the electrically insulating bushing 28 and the electrically insulating washers 29 to electrically insulate the roller from the part A.

Each of the carriages H, duplicates of each other, has the internally threaded boss 30 and the slide member 31 in this instance angular to the plane of action of the rollers thereon.

Each of the blocks I duplicates of each other, has the guide way 32 for the slide members 31 in this instance inclined to the bottom 33 and also has the square ended adjusting screw 34 threaded into the boss 30 and journaled in and longitudinally confined by the boss 35 and the collar 36.

In this instance, the blocks are so formed that they contact each other sidewise and may be bolted together after adjustment if so desired.

The ears 37 extend upwardly above the top surface of the part A; each of the ears, inwardly of the end ones, has the two square ended adjusting screws 38 threaded therein to abut the blocks for movement thereof toward the longitudinal axis of the apparatus and for preventing movement thereof away from the axis and also has the check nut 38a to lock the screw against rotation.

The ears 37 are located so that each screw therein abuts one end of an adjacent one of the blocks so that each block can be moved into and abuttably held in alinement or in dis-alinement with any or all of the other blocks.

In this apparatus, the production of heat is attained by means of electric current through transformers J each connected to the main line 39 with an adjusting means, such as the inductive resistance 40 shown for instance in the connection 41 to adjust the heat producing effect of each transformer. One transformer can be used with series or parallel connection and suitable modification of the brush carrying mechanism.

Each of the transformers is suspended from the scaffold K and has the secondary terminals 42 and 43 carrying the brushes 44 and 45 longitudinally movable therein but electrically contacting therewith and disposed at such an angle that the inner edges of the tube contacting surfaces 46 and 47 thereof are spaced slightly back of the seam edges 48 and 49 of the tubing or on each or opposite side of the seam.

The springs 50 and 51 are secured to the transformer secondary terminals and abut the outer ends of the brushes to press the brushes endwise against the tubing and to assist the terminals in conveying the electric current from the terminals to the brushes.

The rollers are so spaced, transversely of the apparatus, either through adjustment by means of the adjusting screws 38 or 34 or by positionally fixing the rollers to the part A when the apparatus is to be used only for one specific size of tubing, that the seam faces are related as required by or in co-ordination with the progressive steps of welding as the welding proceeds progressively while the tubing is moving through the welding part of the apparatus as, for instance, beginning at the left hand end of the apparatus, the first pair of oppositely spaced rollers may compress the tubing sufficiently far to relate the seam faces so that a pre-heating thereof is effected; the second pair may compress the tubing sufficiently to burn off or otherwise even the higher spots of the seam faces; the third, fourth, fifth, and sixth pair may compress the tubing sufficiently and progressively to relate the seam faces as required for progressive stages of the welding such as compensating for burnt material, or squeezing out burnt material or other material detrimental to a good joint, upsetting the material of the seam faces, or other purposes desirable for a good weld of specific or general tube material; the seventh pair may compress the tubing sufficiently to relate the seam faces for final welding; and the eighth pair may release the sidewise pressure on the tubing somewhat, but retains the relation of the welded joint for a time to permit the weld or joint to set before the tubing is released of sidewise pressure so that the joint will not open due to resiliency of the tube material after the sidewise pressure on the tubing is released.

This roller arrangement may conveniently be called convergent since, usually, the rollers of each successive pair of rollers are a little closer together than those of the just preceding pair except those of the last two pairs which, however, are convergent also although opposite to the convergency of the other pairs.

An important feature of my invention is the means of compressing tubing to relate the seam faces thereof for welding.

The use of rollers for relating the seam faces minimizes friction and increases the efficiency of the apparatus and does not mar the outer surface of the tubing.

The adjusting means for the individual rollers permits of very accurate relation of the seam faces to effect perfect welding.

The electric insulation of the rollers prevents welding current from being diverted from the joint under welding.

The rollers contact the tubing across the diameter and at right angles to the seam thereof. This arrangement applies the seam faces relating pressure to a comparatively cool part of the tubing or remote from the comparatively hotter part thereof and prevents caving in of the tubing or otherwise deforming the same and the concave contacting surface of the rollers aids materially in this respect.

The mounting of the rollers to slide on an angle of 45 degrees moves the rollers simultaneously outwardly and upwardly the same distance upon rotation of the adjusting screw so that tubing of various diameters can be handled by one apparatus and the tubing will always be clamped or compressed by contact substantially across the diameter thereof and remote from the seam thereof.

An important feature of my invention is the means for co-ordination between the various elements to effect the welding.

An important feature of my invention is in the brushes, either of solid structure or laminated to attain a contact area of some extent as compared with a line contact to more efficiently convey to the tubing the heavy amperage current usually employed in electric welding and in that the brushes can extend all the way along that part of the tubing which is being welded, probably with slight spaces between the brushes to permit scale or the like to drop out or off, or the width of the brushes can be limited to more closely limit the path of the electric current through definite or specific parts of the tubing, or some of the brushes can be eliminated, or temporarily or permanently removed, and the transformers can be moved on the scaffold to move the brushes into various relations longitudinally of the tubing to localize the electric current in relation to the seam face relating rollers.

Any one of the elements can be adjusted for co-ordination with any other element, or with any combination or group of other elements, or with all of the other elements, or any group of elements can be adjusted for co-ordination with any one element or with any group of elements or with all the remaining elements so that there is a far reaching extent of usefulness of the apparatus in that adjustment and co-ordination can be made not only for efficient welding of certain sizes of tubing or for certain kinds of material in tubing but can also be made for differently sized tubing and for different kinds of material of tubing.

As mentioned above, I am aware that my application is applicable to apparatus other than the one shown and described and I am further aware that changes and modifications can be made in the structure and arrangement of the parts or elements shown and described, all within the scope of the appended claims; therefore, without limiting myself to the precise application of my invention as shown and described nor to the precise structure and arrangement of the parts or elements as shown and described,

I claim:

1. A welding apparatus for seams of tubing including rollers to relate the seam faces for welding mounted to be moved at an angle of 45 degrees to contact variously sized tubing substantially across the diameter thereof.

2. A welding apparatus for seams of tubing including a bed, opposing blocks on said bed movable toward and away from each other to adjust the same for cross-sectionally differently sized tubing, each of said blocks having a guide way angular with the face of said bed upon which said blocks move, a carriage for each one of said blocks and guided in the guide way thereof, a tubing contacting roller journaled in each one of said carriages, and means for adjusting said rollers to locate tubing in the apparatus.

In testimony of the foregoing, I affix my signature.

HERBERT E. WHITE.